Aug. 1, 1967   R. B. KOCH   3,334,165
METHOD OF BONDING A NYLON COVER ONTO A BRAIDED NYLON HOSE
Original Filed Sept. 6, 1962

INVENTOR
ROBERT B. KOCH
BY *Richard O. Church*
ATTORNEY

United States Patent Office 3,334,165
Patented Aug. 1, 1967

3,334,165
METHOD OF BONDING A NYLON COVER ONTO A BRAIDED NYLON HOSE
Robert B. Koch, Reading, Pa., assignor, by mesne assignments, to The Polymer Corporation, a corporation of Pennsylvania
Original application Sept. 6, 1962, Ser. No. 221,782, now Patent No. 3,251,381, dated May 17, 1966. Divided and this application Mar. 9, 1966, Ser. No. 533,031
4 Claims. (Cl. 264—135)

This application is a divisional of my patent application Ser. No. 221,782, filed Sept. 6, 1962, now Patent 3,251,381.

This invention relates to a pressure hose comprised of a tubular nylon inner core, a synthetic fiber braid covering said inner core, and a thin protective layer of nylon covering said braid.

More particularly, this invention relates to methods and means for bonding a nylon cover onto a braided nylon hose and the product so produced.

U.S. Patent 2,977,839 describes a high pressure nylon hose construction comprised of a nylon inner core and at least one braided cover of synthetic plastic textile fibers bonded thereonto. While this general type construction of hose is quite satisfactory for many purposes, it suffers from the disability that the braided outer cover is subject to abrasive wear, snagging, etc. As the burst strength of the hose depends to a large degree upon the integrity of the braid, damage to the fibers of the braid, as by abrasion and chafing, may materially reduce the design specifications for such hose. Also, cleanliness may be a problem as dirt, grease and other foreign matter may work their way into the interstices of the braid. This is of particular importance when such hose is used in hospitals and surgery as, for example, for high pressure oxygen and refrigeration lines, and is also of concern in industrial usages where cleanliness is desired or fire hazards are to be avoided.

It has been found that a smooth, thin, flexible outer cover of nylon applied over the outer braid of hose of this construction will protect the braid from abrasion and chafing and will present a relatively smooth surface which may readily be cleaned. To be effective, such outer cover should be firmly bonded to the braid in order that it will not break loose or pull away from the braid under the stress of repeated pressure pulsations or flexing operations. If separation between the cover and the braid occurs, the protection afforded by the outer cover is destroyed as the thin, pliable outer cover may then easily be ripped, torn or pulled away and expose the braided yarn.

Accordingly, it is the object of this invention to prepare a nylon hose of the class described with a thin, tightly adherent, flexible nylon outer cover.

Briefly, the object of this invention is achieved by contacting a nylon braided hose with a solvent for the braid and extruding a thin film of nylon over the solvated surface of the braid. It is also desirable, in some instances, to heat the nylon hose prior to solvation and/or to heat the solvent.

The invention is described in more detail in the following description of the drawings.

Figure 1:
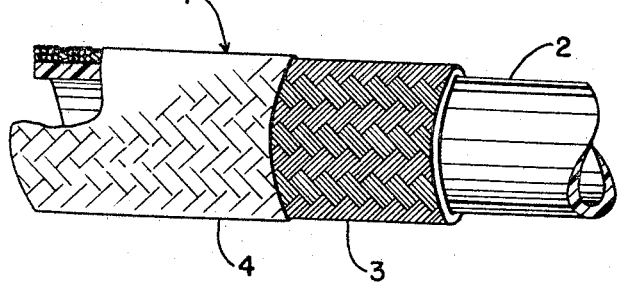
FIG. 1 is a drawing, partially in section and partially in cut away, of a nylon hose of the class described.

In FIG. 1 there is shown hose of the type herein described. The hose 1 is comprised of an inner core of nylon tubing 2 over which has been braided a high tensile strength synthetic cover 3 to which braid is bonded a thin nylon continuous covering 4. Generally, it may be useful for the nylon covering 4 to be between about 2 and 20 mils in thickness.

Figure 2:
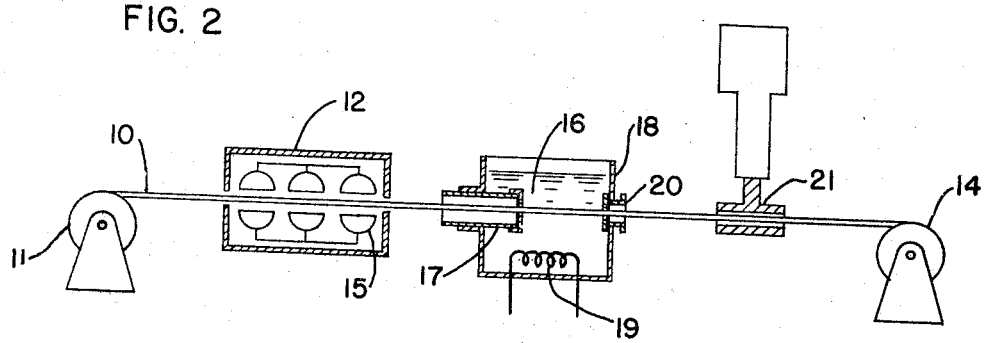
FIG. 2 is a schematic representation of means for applying a thin cover of nylon over a nylon braided hose as disclosed herein.

FIG. 2 shows means for accomplishing the objects of this invention. The nylon braided hose 10 is fed from a reel 11 through a heating oven 12. The oven 12 is here schematically represented as a tunnel heater in which infrared lamps 15 are utilized to heat the braid covering the nylon hose. The nylon hose is led from the feed reel 11 to vessel 18 containing a bath of solvent 16. The vessel 18 is provided with an axially positionable inlet conduit 17 and a fixed discharge conduit 20. Also, the vessel 18 may be provided with heating elements 19 which cooperate with temperature sensing means (not shown) to control the temperature of the solvent 16 if desired. Provision is made to lead the hose from bath 18 to a crosshead extruder 21 and take-up reel 14.

Figure 3:
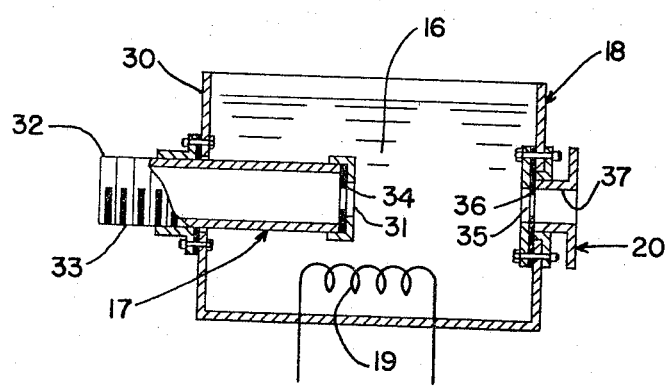
FIG. 3 is a drawing in section showing details of a preferred device for contacting braided nylon hose with a suitable solvent.

In FIG. 3 vessel 18 is shown in greater detail. Essentially, vessel 18 is comprised of sidewalls 30 through which are inserted axially positioned (with respect to the hose) conduit means 17 and 20. Conduit means 17 is comprised of a tubular member 32 threaded as at 33 and having an orifice 31 communicating with solvent bath 16. Flexible wiper blades 34 are positioned at orifice 31 and are constructed in a manner that they will fit snugly around the braided hose when it is drawn through such orifice in order that the flow of solvent out of the vessel 18 will be prevented. By means of the threaded portion 33, conduit 17 may be axially adjusted to enable a variable adjustment of the horizontal distance between orifice 31 and orifice 35 thereby readily enabling control of the detention time of the braided hose in vessel 18. Conduit means 20 is comprised of a tubular member 37 which contains an orifice 35 defined by flexible wiper blades 36 which, similarly to wiper blades 34, prevent loss of solvent 16 from vessel 18. Advantageously, to control the temperature of the solvent material 16, a heating element, here shown schematically as coil 19, may be associated with vessel 18.

In order to bond a tightly adherent nylon cover to a braided cover, it is important to obtain the proper degree of solvation of the braid. This may be controlled by heating the braided cover prior to solvation; by adjusting the temperature and strength of the solvent; and by adjusting the contact time between the hose and the solvent. These factors are controlled to provide sufficient solvation of the braid to insure tight adherence between the braid and the cover and yet prevent excessive solvation that will cause undue degradation and loss of tensile strength of the braid.

Generally the degree of adherence of the cover to the braid depends upon the degree of solvation of the outer surface of the braid. Even so, it is not desirable to have the braided hose in contact with a solvent bath for a prolonged period of time as such exposure of the braid to a solvent bath will permit the solvent to penetrate into the interstices of the braid. Such penetration into the braid is undesirable as the solvent will have an adverse effect upon the tensile strength of the fibers of which the braid is comprised and thus adversely affect the strength of the composite hose. It is therefore desirable to solvate only the outer surface of the braid.

In order to achieve this result, the detention time of the braid in the solvent bath should be quite short. To compensate for a short detention time, which can be 1 second or less, the solvent bath can be heated to elevated temperatures and/or the outer surface of the braid itself can be heated before being brought into contact by the bath. By these means the solvent bath is instantly effective to solvate the surface of the outer strands of the braid and penetration of the solvent deep into the interstices of the braid is avoided.

It should be understood that the activity of a given solvent varies greatly with respect to the type of nylon involved and other factors such as plasticizer content of the nylon. For this reason no single set of optimum operating conditions can be given.

If it is desired to heat the hose prior to contacting it with the solvent bath, a temperature should be selected which will not cause the outer surface of the braid to melt. Generally temperatures up to about 50° F. of the melting point of the braid are useful.

A preferred solvent for use in this invention is a mixture of 1 part resorcinol and 2 parts water by weight. While other common solvents for nylon may be used, such as polyhydric alcohols and phenols, these are either not as effective as resorcinol or are more difficult to handle due to their toxicity and noxious odors.

The temperature of the solvent bath has a great effect upon the speed with which the nylon is solvated. For example, if the braid is comprised of a type 6 nylon (polycaprolactam), a resorcinol solvent bath should be heated to about 200° F. to provide sufficient solvation at useful production rates. On the other hand, the higher tensile strength type 66 nylon (polyhexamethylene adipamide) is more readily solvated and a resorcinol solvent bath at a lower temperature is recommended to prevent undue degradation of the braid.

The temperature of the solvent bath must also be adjusted with respect to the monomer content of the nylon braid. As a generalization, it may be stated that high monomer content nylon is more readily attacked by solvents than low monomer nylon and the temperature of the solvent should be adjusted accordingly.

*Example*

A tube comprised of high monomer content (6–8%) type 6 nylon was extruded and type 66 nylon yarn was used to braid a cover thereonto. The cover was braided onto the tube in accordance with the teachings of U.S. Patent 2,977,839.

The braided nylon hose was led through an infrared oven where the surface of the braid was heated to about 200° F. The hose was immediately contacted with a resorcinol solvent bath (2 parts water and 1 part resorcinol) maintained at a temperature of about 180° F. The inlet and outlet orifices 31 and 35 were positioned about 3 inches apart. As the hose was led through the bath at a rate of about 10 feet per minute, the contact time between the braid and the solvent was about 1.5 seconds.

The hose was then immediately led to a crosshead extruder and a nylon (type 66) cover about 20 mils thick was extruded over the solvated surface of the braid. The hose so produced had a tightly adherent protective cover which could not be torn loose from the braid.

In the above description of this invention, the term nylon refers to the higher melting, fiber-forming polyamides. Of the more common of these useful in the practice of this invention may be mentioned polyhexamethylene adipamide, polyhexamethylene sebacamide, polymers prepared from caprylactam, caprolactam and 11-aminoundecanoic acid, and copolymers, inter-polymers and mixtures thereof.

While the above description has referred primarily to a hose construction in which nylon is used as the textile fiber of the braid, it should be understood that other synthetic fibers may be used. Of other materials that are particularly suited for this purpose should be mentioned the polyesters such as the fiber prepared from terephthalic acid and ethylene glycol sold by Du Pont de Nemours under the trade name "Dacron."

I claim:
1. In the manufacture of a nylon braided hose in which nylon tubing is covered with a nylon braid and a nylon cover is extruded over said braid, the method of tightly bonding said cover to said braid by means of a solvent without materially reducing the strength of said braid, comprising:

heating at least the surface of said nylon braid in a range from approximately 200° F. to within 50° F. of the melting point of the fibers of said braid;

contacting said heated surface with a solvent bath comprised of a solution of resorcinol and water heated to a temperature of from approximately 180° F. to 200° F. for a period of time of from approximately one second to 1.5 seconds; and withdrawing said heated and solvated surface and immediately extruding said nylon cover over said braid.

2. The method of claim 1 wherein said nylon braid is comprised of polyhexamethylene adipamide and said solvent bath is heated to a temperature of about 180° F.

3. The method of claim 1 wherein said nylon braid is comprised of polycaprolactam and said solvent bath is heated to a temperature of about 200° F.

4. The method of claim 1 wherein said solution is comprised of approximately 1 part resorcinol and 2 parts water.

References Cited

UNITED STATES PATENTS

| | | | |
|---|---|---|---|
| 2,888,954 | 6/1959 | Gates | 156—244 X |
| 2,977,839 | 4/1961 | Koch | 156—149 X |
| 3,049,762 | 8/1962 | Jackson | 156—149 |
| 3,062,241 | 11/1962 | Brumbach. | |

EARL M. BERGERT, *Primary Examiner.*

P. DIER, *Assistant Examiner.*